US012695319B2

(12) United States Patent
Chang et al.

(10) Patent No.: US 12,695,319 B2
(45) Date of Patent: Jul. 28, 2026

(54) PROTECTION CIRCUIT OF BATTERY MODULE

(71) Applicant: STL TECHNOLOGY CO., LTD., Kaohsiung City (TW)

(72) Inventors: Wen-Fan Chang, Kaohsiung City (TW); Chun-Chieh Li, Kaohsiung City (TW)

(73) Assignee: STL TECHNOLOGY CO., LTD., Kaohsiung City (TW)

( * ) Notice: Subject to any disclaimer, the term of this patent is extended or adjusted under 35 U.S.C. 154(b) by 747 days.

(21) Appl. No.: 18/125,141

(22) Filed: Mar. 23, 2023

(65) Prior Publication Data

US 2023/0420958 A1 Dec. 28, 2023

(30) Foreign Application Priority Data

Jun. 27, 2022 (TW) .................................. 111123961

(51) Int. Cl.
| | |
|---|---|
| *H02J 7/00* | (2026.01) |
| *G06F 1/26* | (2006.01) |
| *H01M 50/574* | (2021.01) |
| *H02J 7/50* | (2026.01) |
| *H02J 7/60* | (2026.01) |
| *H02J 7/90* | (2026.01) |

(52) U.S. Cl.
CPC ................ *H02J 7/60* (2026.01); *G06F 1/263* (2013.01); *H01M 50/574* (2021.01); *H02J 7/50* (2026.01); *H02J 7/927* (2026.01)

(58) Field of Classification Search
USPC .................................................. 320/134–136
See application file for complete search history.

(56) References Cited

U.S. PATENT DOCUMENTS

| | | | | |
|---|---|---|---|---|
| 2008/0129247 A1* | 6/2008 | Lee | ........................... | H02J 7/54 |
| | | | | 320/134 |
| 2011/0175574 A1* | 7/2011 | Sim | ..................... | H01M 10/482 |
| | | | | 320/121 |
| 2011/0305926 A1* | 12/2011 | Kim | ........................ | H02J 7/663 |
| | | | | 429/50 |

* cited by examiner

*Primary Examiner* — Samuel Berhanu
(74) *Attorney, Agent, or Firm* — HDLS IPR SERVICES; Chun-Ming Shih

(57) ABSTRACT

This disclosure provides a protection circuit of a battery module. The protection circuit includes a master microcontroller, a slave microcontroller, a charging path switch, a discharging path switch, and a switch controller. When the master microcontroller is operating in a normal state, the master microcontroller periodically sends a pulse signal to the slave microcontroller, and enables the switch controller, and then the switch controller enabled may be used to control the turning on or off of the charge path switch or the discharge path switch. When the master microcontroller is operating in an abnormal state, the slave microcontroller does not receive the pulse signal from the master microcontroller, the slave microcontroller disables the switch controller so that the switch controller disabled will be unable to control the turning on or off of the charge path switch or the discharge path switch.

10 Claims, 5 Drawing Sheets

PROTECTION CIRCUIT OF BATTERY MODULE

This non-provisional application claims priority claim under 35 U.S.C. § 119(a) on Taiwan Patent Application No. 111123961 filed Jun. 27, 2022, the entire contents of which are incorporated herein by reference.

FIELD OF THE INVENTION

The disclosure relates to a protection circuit of a battery module, more particularly, a circuit capable of starting a charging and discharging protection to the battery module when a master microcontroller of the battery module is abnormal.

BACKGROUND

In today's battery management system, a microcontroller (MCU) can be used to control the turning on or off of a switch on a charging path, a discharging path, or a charging and discharge path. The microcontroller needs to start a watchdog timer to execute a reset procedure at a fixed time. If the microcontroller enters an endless loop (or called as infinite loop) due to some unknown reasons, it will be unable to start the watchdog timer to perform the reset procedure, and therefore make the switch on the charging path, the discharging path, or the charging and discharge path to be in an uncontrolled state. When the switch on the charging path, the discharging path, or the charging and discharge path is in the uncontrolled state, it will cause that the battery module still has be charged or discharged under low or high temperature, or form the battery module to be over-charged or over-discharged, resulting in a damage of the battery module, or a thermal runaway happened on the battery module.

Furthermore, when the microcontroller enters the endless loop, the microcontroller can be reset via a reset signal generated by an external ASIC watchdog timer. However, before the reasons why the microcontroller enters the endless loop are solved, the switch on the charging path, the discharging path, or the charging and discharge path may be turned on and off repeatedly, so that the battery module still continues to be charged or discharged under low or high temperature, or the conditions of over-charging and over-discharging are still happened on the battery module.

Otherwise, when the microcontroller enters the endless loop, the external ASIC watchdog timer may generate a latch signal to latch that a switch controller is kept in a disabled state for a fixed time. After the fixed time of the latching expires, the switch controller resumes from the disabled state to an enabled state. However, if the reason why the microcontroller enters the endless loop hasn't solved, the switch controller will repeatedly control the turning on or off of the switch on the charging path, the discharging path, or the charging and discharge path so that the battery module still continues to be charged or discharged under low or high temperature, or the conditions of over-charging and over-discharging are still happened on the battery module.

SUMMARY

It is one objective of the disclosure to provide a protection circuit of a battery module, which includes a master microcontroller, a slave microcontroller, a switch controller, a switch on a charging path, and a switch on a discharging path. When the master microcontroller is operating in a normal state, the master microcontroller enables the switch controller, and then the switch controller enabled will be allowed to control the turning on or off of the switch on the charging path and the switch on the discharging path so that a battery unit of the battery module can be charged or discharged via the charging path or the discharging path. On the contrary, when the master microcontroller is operating in an abnormal state, the slave microcontroller disables the switch controller, the switch controller disabled will be unable to control the turning on or off of the switch on the charging path and the switch on the discharging path so as to prevent the battery cells of the battery module to be charged or discharged via the charging path or the discharging path.

It is other objective of the disclosure to provide a protection circuit of a battery module, wherein when the master microcontroller is operating in the normal state, the master microcontroller sends a pulse signal to the slave microcontroller so as to notify the slave microcontroller that the current master microcontroller is normal, and demands the slave microcontroller to stop the controlling of the switch controller; when the master microcontroller is operating in the abnormal state, the slave microcontroller hasn't received the pulse signal sent from the master microcontroller, the slave microcontroller will obtain the controlling right of the switch controller, and disable the switch controller so as to prevent that the switch controller turns on the switch on the charging path and the switch on the discharging path.

It is another objective of the disclosure to provide a protection circuit of a battery module, wherein when the master microcontroller is in the abnormal state, a power management system of the battery module will perform a system restart procedure to the battery module to make that the master microcontroller is able to resume from the abnormal state to the normal state, and enables the switch controller again. Then, the switch controller enabled continues to control the turning on of the switch on the charging path or the switch on the discharging path so that the charging or the discharging of the battery module can be performed.

To achieve the above objective, the present disclosure provide a protection circuit of a battery module, including: a master microcontroller; a slave microcontroller connected to the master microcontroller; a charging path switch; a discharging path switch; and a switch controller connected to the master microcontroller, the slave microcontroller, the charging path switch, and the discharging path switch; wherein when the master microcontroller periodically sends a pulse signal to the slave microcontroller, the master microcontroller enables the switch controller, and then the switch controller enabled is used to control the turning on or off of the charging path switch or the discharging path switch; if the slave microcontroller doesn't receive the pulse signal, the slave microcontroller disables the switch controller.

In one embodiment of the disclosure, when the master microcontroller is in a normal state, the master microcontroller periodically sends the pulse signal to the slave microcontroller, and enables the switch controller; when the master microcontroller is in an abnormal state, the master microcontroller is unable to send the pulse signal to the slave microcontroller, the slave microcontroller disables the switch controller.

In one embodiment of the disclosure, the battery module further includes a power management system; when the master microcontroller is in the abnormal state, the power management system will perform a system restart procedure to the battery module; if the master microcontroller is able to resume from the abnormal state to the normal state after the system restart procedure has performed, the master microcontroller periodically sends the pulse signal to the slave microcontroller again, and enables the switch controller again.

In one embodiment of the disclosure, if the master microcontroller is in the abnormal state, the switch controller is always latched in a disabled state by the slave microcontroller before the power management system has not yet performed the system restart procedure to the battery module.

In one embodiment of the disclosure, the battery module includes a battery unit having a plurality of battery cells, the protection circuit further includes a positive electrode line and a negative electrode line; the positive electrode line is connected between an inner positive electrode of the battery unit and an outer positive electrode of the battery module, the negative electrode line is connected between an inner negative electrode of the battery unit and an outer negative electrode of the battery module, and the charging path switch and the discharging path switch are configured on the positive electrode line or the negative electrode line.

In one embodiment of the disclosure, the battery module includes a battery unit having a plurality of battery cells, the protection circuit further includes a first positive electrode line, a second positive electrode line, and a negative electrode line; the first positive electrode line is connected between an inner positive electrode of the battery unit and a first outer positive electrode of the battery module, the second positive electrode line is connected between the inner positive electrode of the battery unit and a second outer positive electrode of the battery module, the negative electrode line is connected between an inner negative electrode of the battery unit and an outer negative electrode of the battery module, the charging path switch is configured on the first positive electrode line, and the discharging path switch is configured on the second positive electrode line.

In one embodiment of the disclosure, the battery module includes a battery unit having a plurality of battery cells, the protection circuit further includes a positive electrode line, a first negative electrode line, and a second negative electrode line; the positive electrode line is connected between an inner positive electrode of the battery unit and an outer positive electrode of the battery module, the first negative electrode line is connected between an inner negative electrode of the battery unit and a first outer negative electrode of the battery module, the second negative electrode line is connected between the inner negative electrode of the battery unit and a second outer negative electrode of the battery module, the charging path switch is configured on the first negative electrode line, and the discharging path switch is configured on the second negative electrode line.

The present disclosure further provide a protection circuit of a battery module, including: a first master microcontroller; a first slave microcontroller connected to the first master microcontroller; a charging path switch; and a first switch controller connected to the first master microcontroller, the first slave microcontroller, and the charging path switch; wherein when the first master microcontroller periodically sends a first pulse signal to the first slave microcontroller, the first master microcontroller enables the first switch controller, and then the first switch controller enabled is used to control the turning on or off of the charging path switch; if the first slave microcontroller doesn't receive the first pulse signal, the first slave microcontroller disables the first switch controller.

In one embodiment of the disclosure, the protection circuit further including: a second master microcontroller; a second slave microcontroller connected to the second master microcontroller; a discharging path switch; and a second switch controller connected to the second master microcontroller, the second slave microcontroller, and the discharging path switch; wherein when the second master microcontroller periodically sends a second pulse signal to the second slave microcontroller, the second master microcontroller enables the second switch controller, and then the second switch controller enabled is used to control the turning on or off of the discharging path switch; if the second slave microcontroller doesn't receive the second pulse signal, the second slave microcontroller disables the second switch controller.

In one embodiment of the disclosure, when the first master microcontroller is in an abnormal state, the first master microcontroller is unable to send the first pulse signal to the first slave microcontroller, the first slave microcontroller disables the first switch controller; otherwise, when the second master microcontroller is in an abnormal state, the second master microcontroller is unable to send the second pulse signal to the second slave microcontroller, the second slave microcontroller disables the second switch controller.

In one embodiment of the disclosure, the battery module further including a power management system; when the first master microcontroller or the second master microcontroller is in the abnormal state, the power management system will perform a system restart procedure to the battery module; if the first master microcontroller is able to resume from the abnormal state to the normal state after the system restart procedure has performed, the first master microcontroller sends the first pulse signal to the first slave microcontroller again, and enables the first switch controller again; if the second master microcontroller is able to resume from the abnormal state to the normal state after the system restart procedure has performed, the second master microcontroller periodically sends the second pulse signal to the second slave microcontroller again, and enables the second switch controller again.

In one embodiment of the disclosure, if the first master microcontroller is in the abnormal state, the first switch controller is always latched in a disabled state by the controlling of the first slave microcontroller before the power management system has not yet performed the system restart procedure to the battery module.

In one embodiment of the disclosure, if the second master microcontroller is in the abnormal state, the second switch controller is always latched in the disabled state by the controlling of the second slave microcontroller before the power management system has not yet performed the system restart procedure to the battery module.

DETAILED DESCRIPTION OF THE PREFERRED EMBODIMENTS

Figure 1:
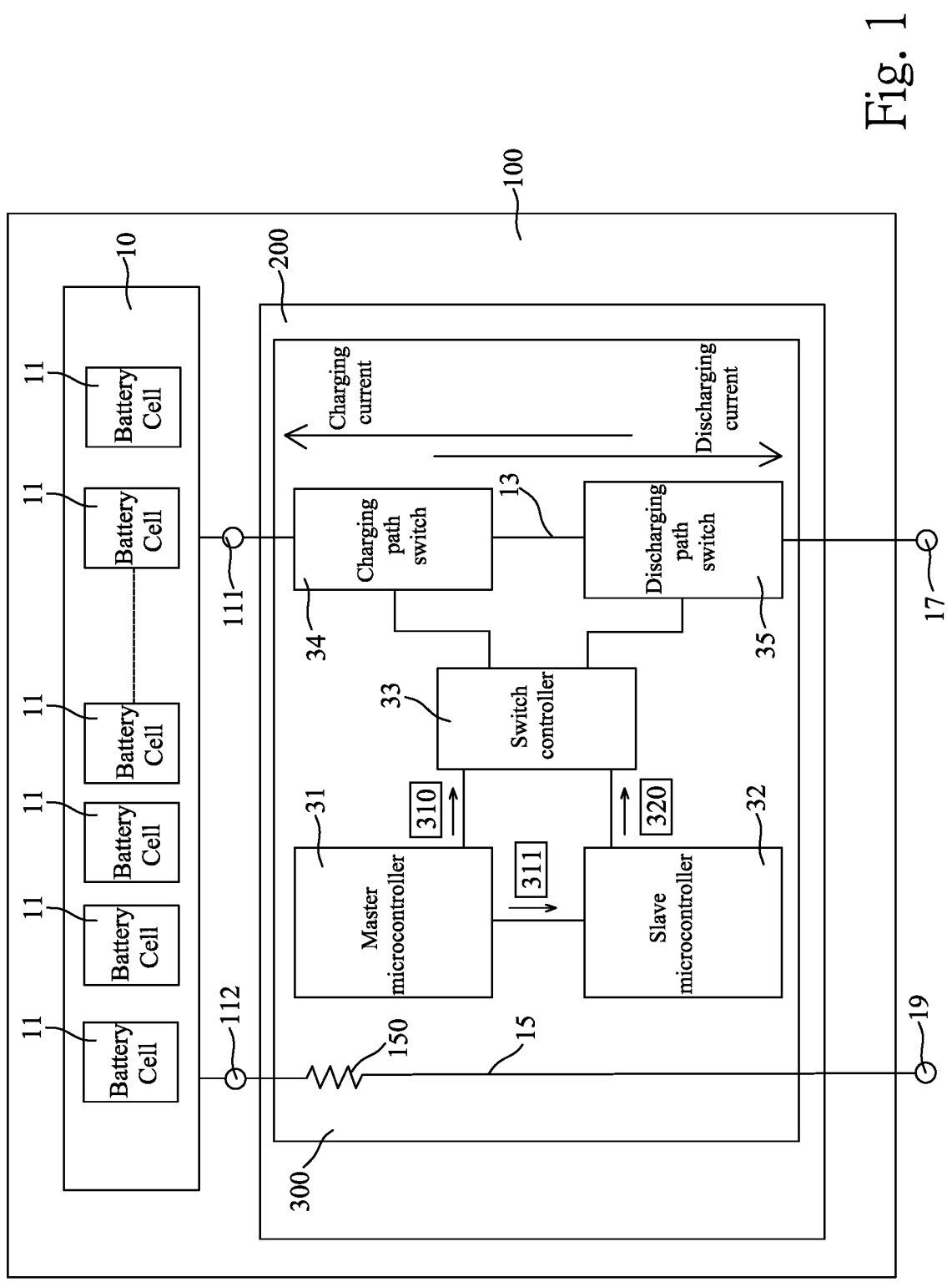
FIG. 1 is a circuit block diagram of a protection circuit of a battery module according to one embodiment of the disclosure.

Referring to FIG. 1, there is a circuit block diagram of a protection circuit of a battery module according to one embodiment of the disclosure. As shown in FIG. 1, the battery module 100 includes a battery unit 10 and a protection circuit 300. The battery unit 10 includes a plurality of battery cells 11. A power management system 200 is provided with a power supply required by the protection circuit 300 in operating.

The protection circuit 300 includes a master microcontroller 31, a slave microcontroller 32, a switch controller 33, a charging path switch 34, and a discharging path switch 35. The master microcontroller 31 is connected to the slave microcontroller 32. The switch controller 33 is connected to the master microcontroller 31, the slave microcontroller 32, the charging path switch 34, and the discharging path switch 35.

An outside (such as shell) of the battery module 100 is provided with an outer positive electrode 17 and an outer negative electrode 19 thereon. The battery unit 10 configured inside the battery module 100 is provided with an inner positive electrode 111 and an inner negative electrode 112. The protection circuit 300 further includes a positive electrode line 13, and a negative electrode line 15 having a resistor 150. The positive electrode line 13 is connected between the inner positive electrode 111 and the outer positive electrode 17. The negative electrode line 15 is connected between the inner negative electrode 112 and the outer negative electrode 19. The charging path switch 34 and the discharging path switch 35 are configured on the positive electrode line 13.

When the master microcontroller 31 is operating in a normal state, a controlling right of the switch controller 33 is held by the master microcontroller 31, the master microcontroller 31 will send an enabled signal 310 to the switch controller 33 to enable the switch controller 33. The switch controller 33 enabled is allowed to turn on the charging path switch 34 on the positive electrode line 13 or turn on the discharging path switch 35 on the positive electrode line 13 so that an outer power supply connected between the outer positive electrode 17 and the outer negative electrode 19 may perform a charging action to the battery unit 10 via the positive electrode line 13, or the battery unit 10 may perform a discharging action to a load connected between the outer positive electrode 17 and the outer negative electrode 19 via the positive electrode line 13.

Furthermore, when the master microcontroller 31 is operating in the normal state, the master microcontroller 31 periodically sends a pulse signal 311 to the slave microcontroller 32. After receiving the pulse signal 311, the slave microcontroller 32 will know that the master microcontroller 31 is operating in the normal state currently, and remain in an idle state.

On the contrary, when the master microcontroller 31 enters an abnormal state of the endless loop because of the unknown reason, it will not be able to send the pulse signal 310 to the slave microcontroller 32. After the slave microcontroller 32 hasn't received the pulse signal 310 for a period of time, the controlling right of the switch controller 33 will be transferred from the master microcontroller 31 to the slave microcontroller 32, and then the slave microcontroller 32 sends a disabled signal 320 to the switch controller 33 to disable the switch controller 33. The switch controller 33 disabled will be unable to turn on the charging path switch 34 on the positive electrode line 13 or turn on the discharging path switch 35 on the positive electrode line 13. Thus, when the master microcontroller 31 is abnormal, the outer power supply can be prohibited to perform the charging to the battery unit 10 via the positive electrode line 13, or the battery unit 10 can be prohibited to perform the discharging to the load via the positive electrode line 13.

Accordingly, when the master microcontroller 31 is abnormal, the charging or the discharge of the battery unit 10 will be prohibited because of the switch controller 33 disabled by the slave microcontroller 32, in such a way that the charging or the discharge of the battery module 100 under low or high temperature can be avoided, and therefore the probability of damage of the battery cells 11 of the battery module 100 can be reduced, or the conditions that the battery module 100 is over-charged or over-discharged can be avoided, and therefore the probability of thermal runaway of the battery cells 11 of the battery module 100 can be reduced.

Besides, when the master microcontroller 31 is abnormal, the power management system 200 will perform a system restart procedure to the battery module 100. If the master microcontroller 31 is able to resume from the abnormal state to the normal state after the system restart procedure has performed, the master microcontroller 31 will obtain the controlling right of the switch controller 33 again, and sends the enabled signal 310 to the switch controller 33 again so that the switch controller 33 can return to the enabled state, and continue to control the turning on or off of the charging path switch 34 or the discharging path switch 35. After the master microcontroller 31 resumes to normal, it will periodically send the pulse signal 311 to the slave microcontroller 32 again, so as to notify the slave microcontroller 32 that the master microcontroller 31 is back to the normal state, and demands the slave microcontroller 32 to stop the controlling of the switch controller 33.

Furthermore, before the power management system 200 performs the system restart procedure, even if the master microcontroller 31 resumes from the abnormal state to the normal state, the switch controller 33 is still latched in the disabled state by the controlling of the slave microcontroller 32, in such a way that it will be possible to prevent the switch controller 33 to be controlled by the master microcontroller 31 whose operating state is unstable so as to improve the safety of the battery module 100 in use.

Figure 2:
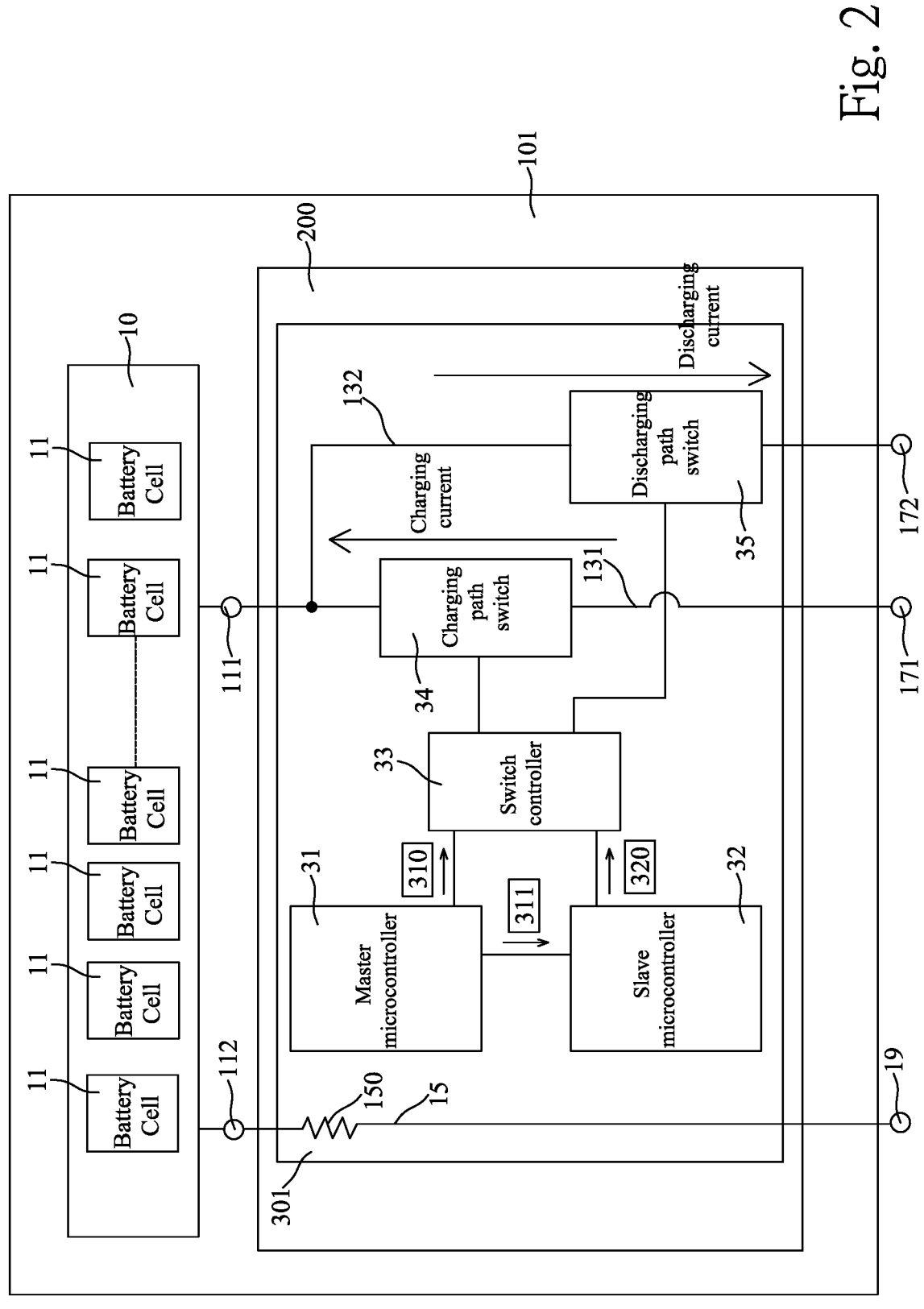
FIG. 2 is a circuit block diagram of a protection circuit of a battery module according to other embodiment of the disclosure.

Referring to FIG. 2, there is a circuit block diagram of a protection circuit of a battery module according to other embodiment of the disclosure. In the embodiment of FIG. 1, the protection circuit 300 of the battery module 100 is only including one positive electrode line 13 and one corresponding outer positive electrode 17. In the present embodiment, the protection circuit 301 of the battery module 101 is further including two positive electrode lines 131, 132 (such as a first positive electrode line 131 and a second positive electrode line 132) and two corresponding outer positive electrodes 171, 172 (such as a first outer positive electrode 171 and a second outer positive electrode 172).

The first positive electrode line 131 is connected between the inner positive electrode 111 and the first outer positive electrode 171, and the second positive electrode line 132 is connected between the inner positive electrode 111 and the second outer positive electrode 172. The charging path switch 34 is configured on the first positive electrode line 131, and the discharging path switch 35 is configured on the second positive electrode line 132.

When the switch controller 33 is enabled by the master microcontroller 31, the switch controller 33 enabled can be used to turn on the charging path switch 34 on the first positive electrode line 131 so that an outer power supply connected between the first outer positive electrode 171 and the outer negative electrode 19 may perform a charging action to the battery unit 10 via the first positive electrode line 131, or the switch controller 33 enabled can be used to turn on the discharging path switch 35 on the second positive electrode line 132, so that the battery unit 10 may perform a discharging action to a load connected between the second outer positive electrode 172 and the outer negative electrode 19 via the second positive electrode line 132.

Figure 3:
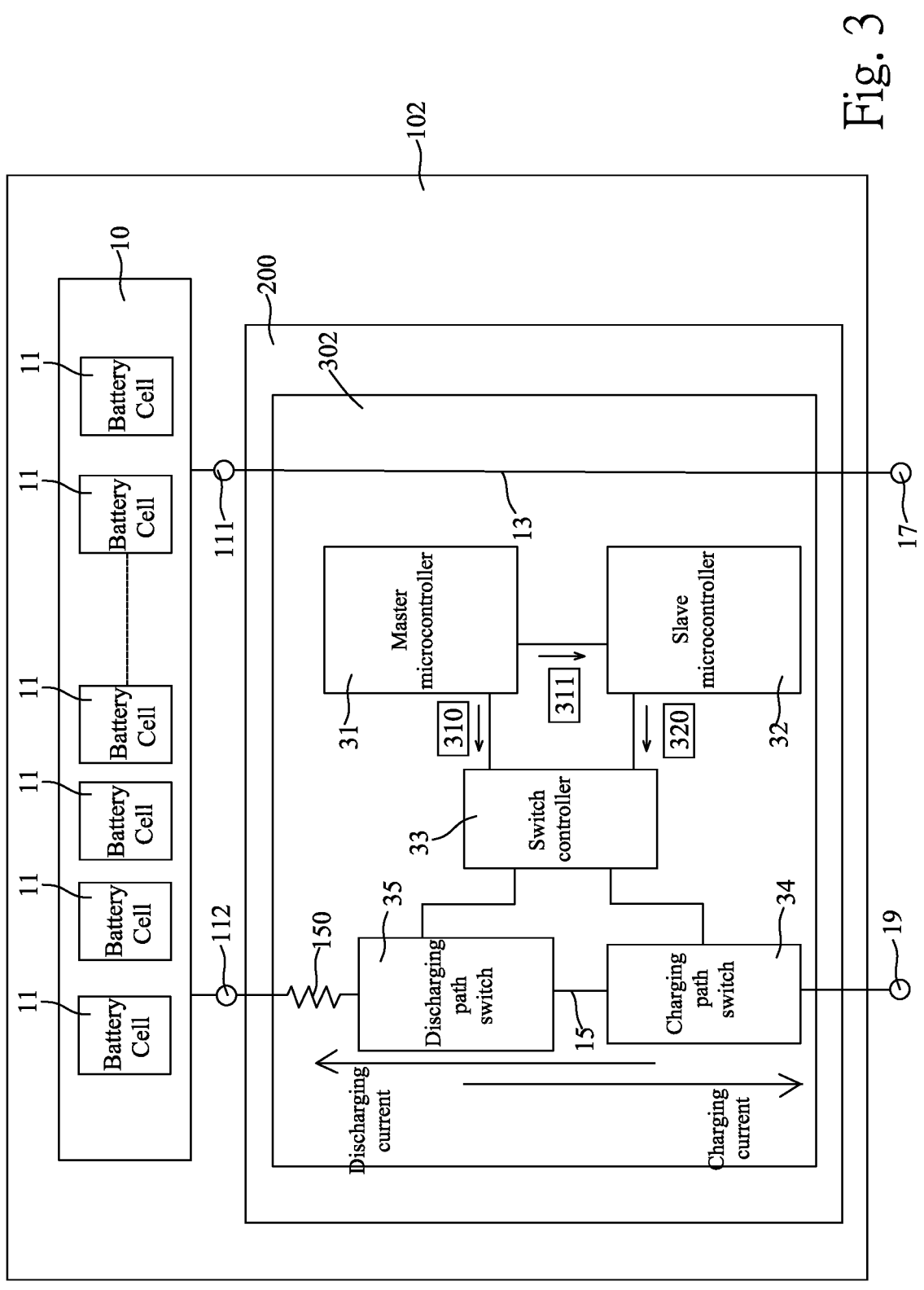
FIG. 3 is a circuit block diagram of a protection circuit of a battery module according to another embodiment of the disclosure.

Referring to FIG. 3, there is a circuit block diagram of a protection circuit of a battery module according to another embodiment of the disclosure. In the protection circuit 300 of the battery module 100 of the above embodiment, the charging path switch 34 and the discharging path switch 35 are configured on the positive electrode line 13. In the protection circuit 302 of the battery module 102 of the present embodiment, the charging path switch 34 and the discharging path switch 35 are configured on the negative electrode line 15.

When the switch controller 33 is enabled by the master microcontroller 31, the switch controller 33 enabled can be used to turn on the charging path switch 34 and the discharging path switch 35 on the negative electrode line 15 so that an outer power supply connected between the outer positive electrode 17 and the outer negative electrode 19 may perform a charging action to the battery unit 10 via the negative electrode line 15, or the battery unit 10 may perform a discharging action to a load connected between the outer positive electrode 17 and the outer negative electrode 19 via the negative electrode line 15.

Figure 4:
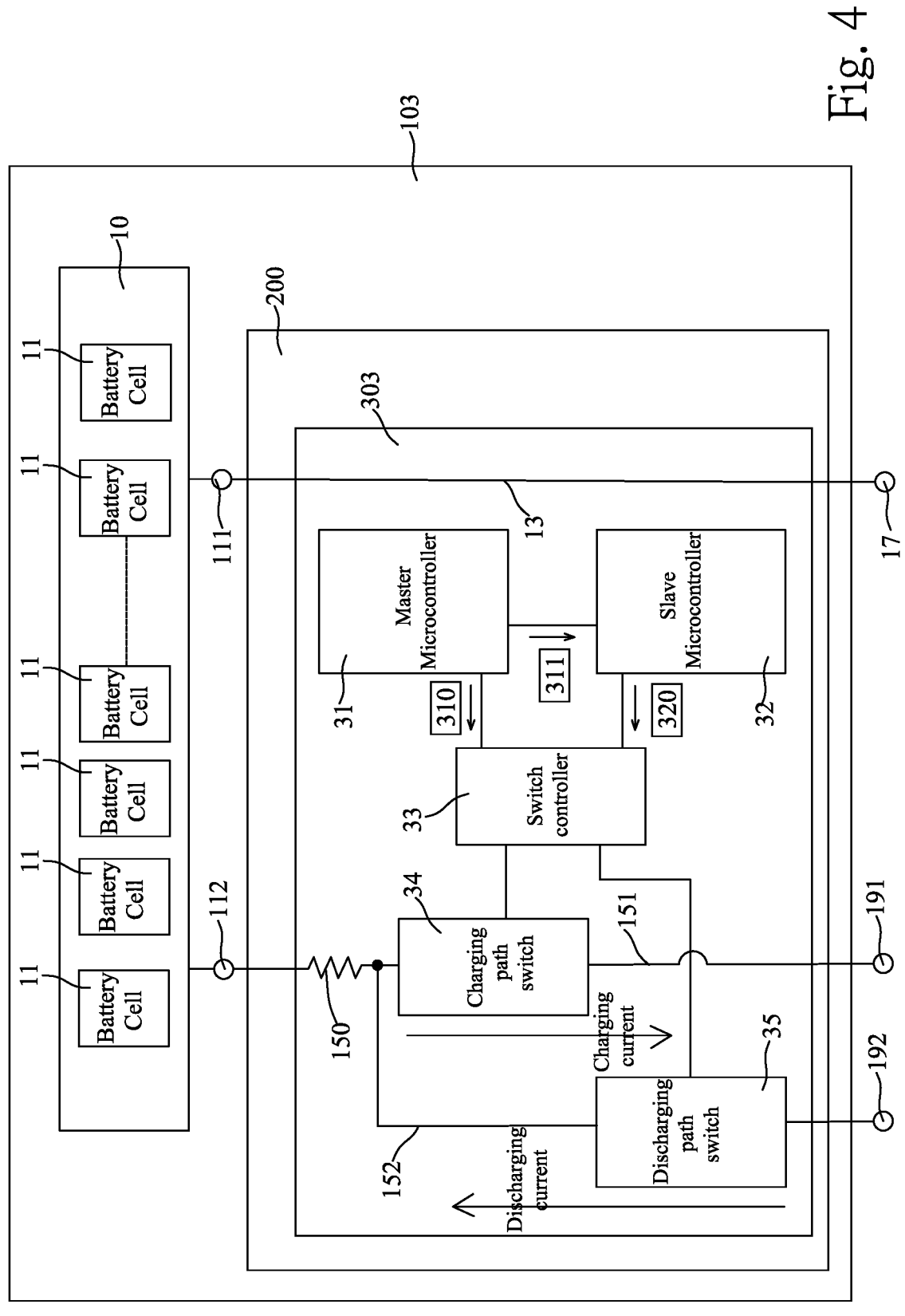
FIG. 4 is a circuit block diagram of a protection circuit of a battery module according to another embodiment of the disclosure.

Referring to FIG. 4, there is a circuit block diagram of a protection circuit of a battery module according to another embodiment of the disclosure. In the embodiment of FIG. 3, the protection circuit 302 of the battery module 102 is only including one negative electrode line 15 and one corresponding outer negative electrode 19. In the present embodiment, the protection circuit 303 of the battery module 103 is further including two negative electrode lines 151, 152 (such as a first negative electrode line 151 and a second negative electrode line 152) and two corresponding outer negative electrodes 191, 192 (such as a first outer negative electrode 191 and a second outer negative electrode 192).

The first negative electrode line 151 is connected between the inner negative electrode 112 and the first outer negative electrode 191, and the second negative electrode line 152 is connected between the inner negative electrode 112 and the second outer negative electrode 192. The charging path switch 34 is configured on the first negative electrode line 151, and the discharging path switch 35 is configured on the second negative electrode line 152.

When the switch controller 33 is enabled by the master microcontroller 31, the switch controller 33 enabled can be used to turn on the charging path switch 34 on the first negative electrode line 151 so that an outer power supply connected between the outer positive electrode 17 and the first outer negative electrode 191 may perform a charging action to the battery unit 10 via the first negative electrode line 151, or the switch controller 33 enabled can be used to turn on the discharging path switch 35 on the second negative electrode line 152 so that the battery unit 10 may perform a discharging action to a load connected between the outer positive electrode 17 and the second outer negative electrode 192 via the second negative electrode line 152.

Figure 5:
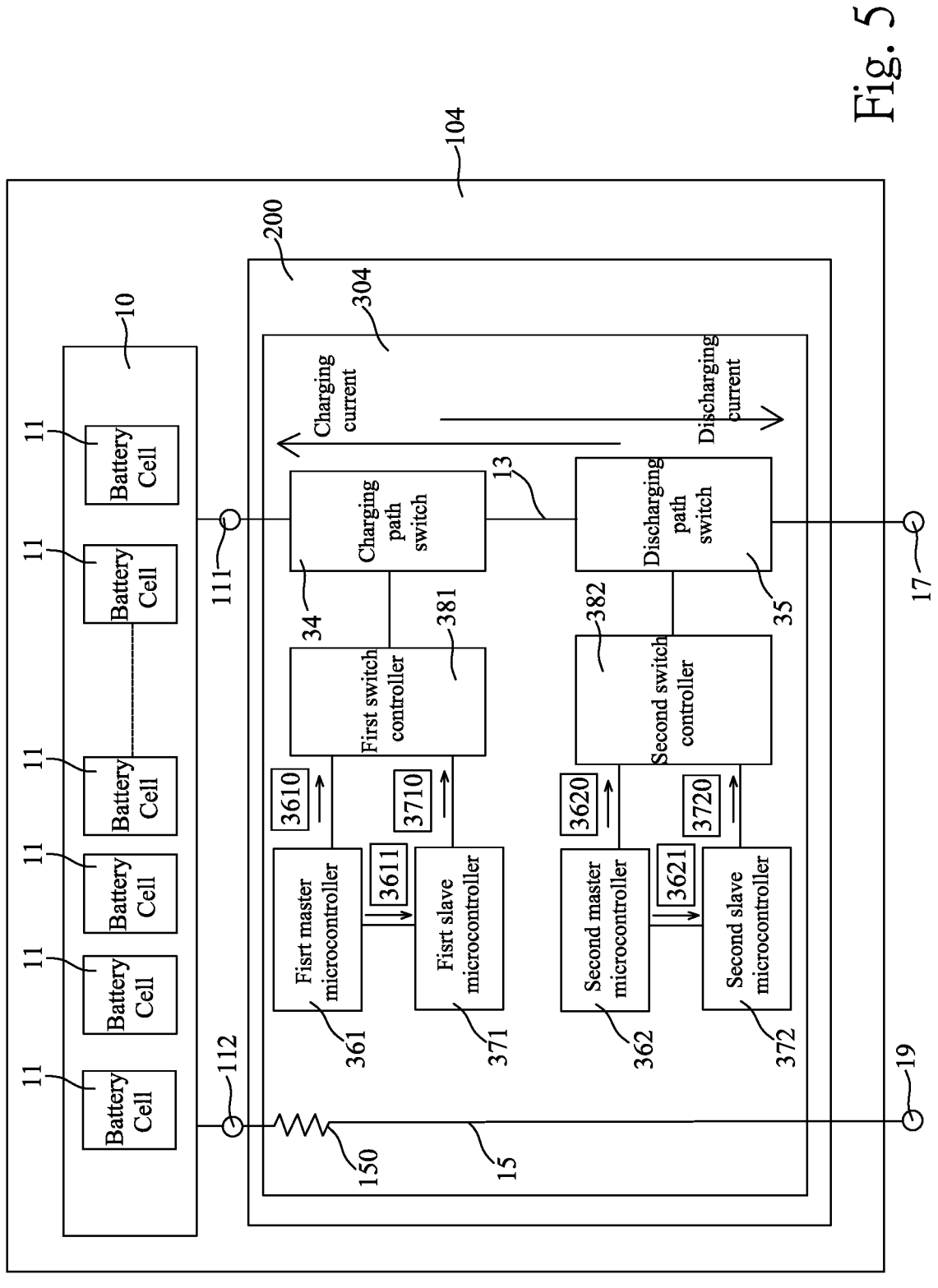
FIG. 5 is a circuit block diagram of a protection circuit of a battery module according to another embodiment of the disclosure.

Referring to FIG. 5, there is a circuit block diagram of a protection circuit of a battery module according to another embodiment of the disclosure. In the embodiment of FIG. 1, the protection circuit 300 of the battery module 100 uses a set of the master microcontroller, the slave microcontroller, and the switch controller to control the turning on or off the charging path switch 34 and the discharging path switch 35. In the present embodiment, the protection circuit 304 of the battery module 104 uses two set of the master microcontrollers, the slave microcontrollers, and the switch controllers to control the turning on or off the charging path switch 34 and the discharging path switch 35.

As shown in FIG. 5, the power management system 200 is provided with a power supply required by the protection circuit 304 in operating. The protection circuit 304 includes a first master microcontroller 361, a first slave microcontroller 371, a first switch controller 381, and a charging path switch 34. The first switch controller 381 is connected to the first master microcontroller 361, the first slave microcontroller 371, and the charging path switch 34. The charging path switch 34 is configured on the positive electrode line 13.

When the first master microcontroller 361 is operating in a normal state, the first master microcontroller 361 will send a first enabled signal 3610 to the first switch controller 381 to enable the first switch controller 381. The first switch controller 381 enabled is allowed to turn on the charging path switch 34 on the positive electrode line 13 so that an outer power supply connected between the outer positive electrode 17 and the outer negative electrode 19 may perform a charging action to the battery unit 10 via the positive electrode line 13. During the first master microcontroller 361 is operating in the normal state, the first master microcontroller 361 periodically sends a first pulse signal 3611 to the first slave microcontroller 371. After receiving the first pulse signal 3611, the first slave microcontroller 371 will know that the first master microcontroller 361 is normal, and remain in an idle state.

On the contrary, when the first master microcontroller 361 enters an abnormal state of the endless loop because of the unknown reason, the first master microcontroller 361 will be unable to send the first pulse signal 3611 to the first slave microcontroller 371, the controlling right of the first switch controller 381 will be transferred from the first master microcontroller 361 to the first slave microcontroller 381, and then the first slave microcontroller 381 will send a first disabled signal 3710 to the first switch controller 381 to disable the first switch controller 381. The first switch controller 381 disabled will be unable to turn on the charging path switch 34, such that the outer power supply can be prohibited to perform the charging to the battery unit 10 via the positive electrode line 13.

Accordingly, when the first master microcontroller 361 is abnormal, the charging of the battery unit 10 will be prohibited because of the first switch controller 381 disabled by the first slave microcontroller 371, in such a way that the charging of the battery module 100 under low or high temperature can avoided, and therefore the probability of damage of the battery cells 11 of the battery module 100 can be reduced, or the conditions that the battery module 100 is over-charged can be avoided, and therefore the probability of thermal runaway of the battery cells 11 of the battery module 100 can be reduced.

The protection circuit 304 further includes a second master microcontroller 362, a second slave microcontroller 372, a second switch controller 382, and a discharging path switch 35. The second switch controller 382 is connected to the second master microcontroller 362, the second slave microcontroller 372, and the discharging path switch 35. The discharging path switch 35 is configured on the positive electrode line 13.

When the second master microcontroller 362 is operating in a normal state, the second master microcontroller 362 will send a second enabled signal 3620 to the second switch controller 382 to enable the second switch controller 382. The second switch controller 382 enabled is allowed to turn on the discharging path switch 35 on the positive electrode line 13 so that the battery unit 10 may perform a discharging action to a load connected between the outer positive electrode 17 and the outer negative electrode 19 via the positive electrode line 13. During the second master microcontroller 362 is operating in the normal state, the second master microcontroller 362 periodically sends a second pulse signal 3621 to the second slave microcontroller 372. After receiving the second pulse signal 3621, the second slave microcontroller 372 will know that the second master microcontroller 362 is normal, and remain in an idle state.

On the contrary, when the second master microcontroller 362 enters an abnormal state of the endless loop because of the unknown reason, the second master microcontroller 362 will not be able to send the second pulse signal 3621 to the second slave microcontroller 372, the controlling right of the second switch controller 382 will be transferred from the second master microcontroller 362 to the second slave microcontroller 382, and then the second slave microcontroller 382 will send a second disabled signal 3720 to the second slave microcontroller 382 to disable the second switch controller 382. The second switch controller 382 disabled will be unable to turn on the discharging path switch 35, such that the battery unit 10 can be prohibited to perform the discharging to the load via the positive electrode line 13.

Accordingly, when the second master microcontroller 362 is abnormal, the discharging of the battery unit 10 will be prohibited because of the second switch controller 382 disabled by the second slave microcontroller 372, and thus the conditions that the discharging or over-discharging of the battery module 100 under low or high temperature can be avoided to reduce the probability of damage of the battery cells 11 of the battery module 100.

Similarly, when the first master microcontroller 361 or the second master microcontroller 362 is abnormal, if the first master microcontroller 361 or the second master microcontroller 362 wants to retrieve the controlling right of the first switch controller 381 or the second switch controller 382, the power management system 200 must perform the system restart procedure to the battery module 100. After the system restart procedure has performed, the first master microcontroller 361 or the second master microcontroller 362 resumes from the abnormal state to the normal state, the first master microcontroller 361 or the second master microcontroller 362 will obtain the control right of the first switch controller 381 or the second switch controller 382 again, and sends the enabled signal 3610/3620 to the first switch controller 381 or the second switch controller 382 so that the first switch controller 381 or the second switch controller 382 can return to the enabled state, and continue to control the turning on or off of the charging path switch 34 or the discharging path switch 35. After the first master microcontroller 361 or the second master microcontroller 362 resumes to normal, the first master microcontroller 361 or the second master microcontroller 362 will periodically send the pulse signal 3611/3612 to the first slave microcontroller 371 or the second slave microcontroller 372 again, so as to notify the first slave microcontroller 371 or the second slave microcontroller 372 that the first master microcontroller 361 or the second master microcontroller 362 is back to normal, and demands the first slave microcontroller 371 or the second slave microcontroller 372 to stop the controlling of the first switch controller 381 or the second switch controller 382.

Furthermore, before the power management system 200 performs the system restart procedure, even if the first master microcontroller 361 or the second master microcontroller 362 resumes from the abnormal state to the normal state, the first switch controller 381 or the second switch controller 382 must be latched in the disabled state by the first slave microcontroller 371 or the second slave microcontroller 372, in such a way that it will be possible to prevent the first switch controller 381 or the second switch controller 382 to be controlled by the first master microcontroller 361 or the second microcontroller 362 whose operating state is unstable so as to improve the safety of the battery module 100 in use.

In the disclosure, the charging path switch 34 and the discharging path switch 35 may be configured on the same positive electrode line 13, or configured on the same negative electrode line 15, or respectively configured on the different positive electrode line 131, 132, or respectively configured on the different negative electrode line 151, 152. Various configuration positions of the charging path switch 34 and the discharging path switch 35 have been clearly disclosed in FIG. 1 to FIG. 4, respectively.

The above disclosure is only the preferred embodiment of the present invention, and not used for limiting the scope of the present invention. All equivalent variations and modifications on the basis of shapes, structures, features and spirits described in claims of the present invention should be included in the claims of the present invention.

The invention claimed is:

1. A protection circuit of a battery module, including:
    a master microcontroller;
    a slave microcontroller connected to the master microcontroller;
    a charging path switch;
    a discharging path switch; and
    a switch controller connected to the master microcontroller, the slave microcontroller, the charging path switch, and the discharging path switch;
    wherein when the master microcontroller periodically sends a pulse signal to the slave microcontroller, the master microcontroller enables the switch controller, and then the switch controller enabled is used to control the turning on or off of the charging path switch or the discharging path switch; if the slave microcontroller doesn't receive the pulse signal, the slave microcontroller disables the switch controller;
    wherein the battery module includes a battery unit having a plurality of battery cells, the protection circuit further includes a first positive electrode line, a second positive electrode line, and a negative electrode line; the first positive electrode line is connected between an inner positive electrode of the battery unit and a first outer positive electrode of the battery module, the second positive electrode line is connected between the inner positive electrode of the battery unit and a second outer positive electrode of the battery module, the negative electrode line is connected between an inner negative electrode of the battery unit and an outer negative electrode of the battery module, the charging path switch is configured on the first positive electrode line, and the discharging path switch is configured on the second positive electrode line.

2. The protection circuit according to claim 1, wherein when the master microcontroller is in a normal state, the master microcontroller periodically sends the pulse signal to the slave microcontroller, and enables the switch controller; when the master microcontroller is in an abnormal state, the master microcontroller is unable to send the pulse signal to the slave microcontroller, the slave microcontroller disables the switch controller.

3. The protection circuit according to claim 2, wherein the battery module further includes a power management system; when the master microcontroller is in the abnormal state, the power management system will perform a system restart procedure to the battery module; if the master microcontroller is able to resume from the abnormal state to the normal state after the system restart procedure has performed, the master microcontroller periodically sends the pulse signal to the slave microcontroller again, and enables the switch controller again.

4. The protection circuit according to claim 3, if the master microcontroller is in the abnormal state, the switch controller is always latched in a disabled state by the slave microcontroller before the power management system has not yet performed the system restart procedure to the battery module.

5. A protection circuit of a battery module, including:
a first master microcontroller;
a first slave microcontroller connected to the first master microcontroller;
a charging path switch; and
a first switch controller connected to the first master microcontroller, the first slave microcontroller, and the charging path switch;
wherein when the first master microcontroller periodically sends a first pulse signal to the first slave microcontroller, the first master microcontroller enables the first switch controller, and then the first switch controller enabled is used to control the turning on or off of the charging path switch; if the first slave microcontroller doesn't receive the first pulse signal, the first slave microcontroller disables the first switch controller;
wherein the battery module includes a battery unit having a plurality of battery cells, the protection circuit further includes a first positive electrode line, a second positive electrode line, and a negative electrode line; the first positive electrode line is connected between an inner positive electrode of the battery unit and a first outer positive electrode of the battery module, the second positive electrode line is connected between the inner positive electrode of the battery unit and a second outer positive electrode of the battery module, the negative electrode line is connected between an inner negative electrode of the battery unit and an outer negative electrode of the battery module, the charging path switch is configured on the first positive electrode line, and the discharging path switch is configured on the second positive electrode line.

6. The protection circuit according to claim 5, further including:
a second master microcontroller;
a second slave microcontroller connected to the second master microcontroller;
a discharging path switch; and
a second switch controller connected to the second master microcontroller, the second slave microcontroller, and the discharging path switch;
wherein when the second master microcontroller periodically sends a second pulse signal to the second slave microcontroller, the second master microcontroller enables the second switch controller, and then the second switch controller enabled is used to control the turning on or off of the discharging path switch; if the second slave microcontroller doesn't receive the second pulse signal, the second slave microcontroller disables the second switch controller.

7. The protection circuit according to claim 6, wherein when the first master microcontroller is in an abnormal state, the first master microcontroller is unable to send the first pulse signal to the first slave microcontroller, the first slave microcontroller disables the first switch controller; when the second master microcontroller is in an abnormal state, the second master microcontroller is unable to send the second pulse signal to the second slave microcontroller, the second slave microcontroller disables the second switch controller.

8. The protection circuit according to claim 7, wherein the battery module further includes a power management system; when the first master microcontroller or the second master microcontroller is in the abnormal state, the power management system will perform a system restart procedure to the battery module; if the first master microcontroller is able to resume from the abnormal state to the normal state after the system restart procedure has performed, the first master microcontroller sends the first pulse signal to the first slave microcontroller again, and enables the first switch controller again; if the second master microcontroller is able to resume from the abnormal state to the normal state after the system restart procedure has performed, the second master microcontroller periodically sends the second pulse signal to the second slave microcontroller again, and enables the second switch controller again.

9. The protection circuit according to claim 8, if the first master microcontroller is in the abnormal state, the first switch controller is always latched in a disabled state by the first slave microcontroller before the power management system has not yet performed the system restart procedure to the battery module.

10. The protection circuit according to claim 8, if the second master microcontroller is in the abnormal state, the second switch controller is always latched in the disabled state by the second slave microcontroller before the power management system has not yet performed the system restart procedure to the battery module.

* * * * *